United States Patent
Riggs et al.

(10) Patent No.: US 8,589,368 B1
(45) Date of Patent: *Nov. 19, 2013

(54) MEDIA PLAYERS AND DOWNLOAD MANAGER FUNCTIONALITY

(75) Inventors: Brian Riggs, San Francisco, CA (US); Daniel J. Cooley, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/211,647

(22) Filed: Aug. 17, 2011

Related U.S. Application Data

(63) Continuation of application No. 11/850,245, filed on Sep. 5, 2007, now Pat. No. 8,015,167.

(51) Int. Cl.
*G06F 17/30* (2006.01)

(52) U.S. Cl.
USPC ............ 707/705; 707/E17.005; 707/E17.102; 707/E17.12

(58) Field of Classification Search
USPC ............. 707/705, E17.005, E17.102, E17.12; 715/716, 722, 745; 709/231
See application file for complete search history.

(56) References Cited

U.S. PATENT DOCUMENTS

| | | | |
|---|---|---|---|
| 5,854,923 | A | 12/1998 | Dockter et al. |
| 6,347,398 | B1 | 2/2002 | Parthasarathy et al. |
| 2001/0027479 | A1* | 10/2001 | Delaney et al. ............... 709/216 |
| 2002/0062336 | A1* | 5/2002 | Teodosiu et al. .............. 709/201 |
| 2003/0131226 | A1 | 7/2003 | Spencer et al. |
| 2003/0163815 | A1 | 8/2003 | Begeja et al. |
| 2004/0250246 | A1 | 12/2004 | Veselov et al. |
| 2005/0183120 | A1* | 8/2005 | Jain et al. ......................... 725/46 |
| 2006/0129917 | A1* | 6/2006 | Volk et al. ...................... 715/513 |
| 2006/0195882 | A1 | 8/2006 | Tischer et al. |
| 2007/0094705 | A1 | 4/2007 | Crowley et al. |
| 2008/0134043 | A1* | 6/2008 | Georgis et al. ................ 715/733 |
| 2009/0222450 | A1* | 9/2009 | Zigelman ........................ 707/10 |

OTHER PUBLICATIONS

U.S. Appl. No. 11/850,245, filed Sep. 5, 2007.
Office Action dated Mar. 19, 2010 in parent U.S. Appl. No. 11/850,245.
Office Action dated Aug. 31, 2010 in parent U.S. Appl. No. 11/850,245.
Advisory Action dated Nov. 10, 2010 in parent U.S. Appl. No. 11/850,245.
Notice of Allowance dated Apr. 19, 2011 in parent U.S. Appl. No. 11/850,245.

* cited by examiner

*Primary Examiner* — Fred I Ehichioya
*Assistant Examiner* — Shiow-Jy Fan
(74) *Attorney, Agent, or Firm* — Kilpatrick Townsend & Stockton LLP

(57) ABSTRACT

A media player monitors a media feed (e.g., a web feed) for availability of newly published content available over a network. Via the feed, the media player can receive notification that certain retrievable content (e.g., the same content or substantially similar content) is available from multiple different locations over the network. The notification can include multiple pointers for use by the media player to retrieve the content. For example, a first pointer of the multiple pointers can identify a first remote location over the network in which to retrieve the content, a second pointer can identify a second remote location over the network in which to retrieve the content, and so on. The media player can have an associated download manager that selects an appropriate one of the pointers to retrieve the content depending on which of one or more download by applications resides on a computer system.

11 Claims, 8 Drawing Sheets

| | | | | | | | |
|---|---|---|---|---|---|---|---|
| Downloads 3 Active, 1 Failed, 1 Paused | | | | | | | |
| Order ▽ | Title | Show | Progress | Status | ETA | File Size | Length |
| 1 | LastStand | Friends | ▨▨ | Active | 0:05 | 0.5gb | 0:30 |
| 2 | Seven Minutes to … | Heroes | ▨▨ | Failed, Server… | 4:12 | 0.5gb | 1:00 |
| 3 | Orange Float | 30 Rock | ▨ | Active | 0:35 | 230mb | 1:00 |
| 4 | The Mooninites | Aqua Teen Hunge | ▨ | Active | 0:03 | 263mb | 0:30 |
| 5 | Mentos and Coke | | ▨▨ | Paused | – | 3mb | 0:05 |
| 6 | JATO Cat | Mythbusters | – | Queued | – | 58mb | 1:00 |
| 7 | Girl in the Gold Boots | MST3K | – | Queued | – | 24mb | 2:00 |
| 8 | Season Finale | Survivor 5 | – | Queued | – | 684mb | 2:00 |

MEDIA PLAYERS AND DOWNLOAD MANAGER FUNCTIONALITY

CROSS-REFERENCE TO RELATED APPLICATION

This application is a continuation application of U.S. Ser. No. 11/850,245 filed on Sep. 5, 2007, now U.S. Pat. No. 8,015,167, the contents of which are incorporated herein by reference.

BACKGROUND

Conventional computer systems enable production and distribution of multimedia data, including video, audio and image data. Such production is increasing at a phenomenal rate due to the growing popularity of the Internet, the growing affordability of personal computers capable of efficiently processing multimedia data to provide a pleasing experience for users, and the enhanced viewing experience that multimedia provides over "text-only" type images.

People now access and use multimedia data in numerous ways. One way that people access multimedia data is over a network such as the Internet. For example, people using web browsers on personal computers now routinely access multimedia data by surfing the World Wide Web via the Internet.

Countless numbers of content providers link multimedia data to web pages accessible by people using web browsers. Accordingly, via use of today's web pages, persons using media player applications (e.g., web browsers) can access a web server operated by a content provider to playback content such as view video clips, listen to audio clips, or view images made available by the content provider.

To request media content such as digital video, audio, or some other sampled content from a server, a corresponding client typically provides the global address of the content in the form of a Uniform Resource Locator (URL). After receiving a request for content, a respective server receiving the request then accesses the content and sends or "streams" it to the client as a continuous data stream that is played back by the client as the stream is received. Alternatively, the client can play the content for viewing by the user (e.g., via a media player application) upon completion of receiving all of the content data from the server.

SUMMARY

Conventional techniques for retrieving content can suffer from a number of deficiencies. For example, conventional techniques enable a respective computer user to initiate access of content via use of pointers such as URLs. In many cases, the computer user explicitly selects a representation (e.g., a selectable icon on a display screen) associated with a respective URL reference to obtain information from a particular website. If the same (or similar) retrievable content can be obtained from two or more different remote locations via use of multiple different URLs, the process of retrieving content can be cumbersome. For example, the computer user may be shown multiple different URLs on a respective display screen for manual selection of one of the URLs to retrieve remotely stored content.

In certain cases, a computer system operated by a respective user may not support retrieval of data from a particular server because the computer is not configured to retrieve data according to a respective protocol supported by the remote server. In such an instance, if the user selects a URL that requires a particular type of download application or program not currently installed on a respective computer system, the computer user will receive an error indicating a download failure. To properly download certain content, a computer system may be required to install a corresponding download application.

There are many different types of download applications available today. Manually keeping track of which download applications are installed on a user's computer system can be quite tedious. Accordingly, it may be difficult for a user to make a correct decision as to which of multiple URLs to pick to download content and which download applications should be resident on the user's respective computer system to retrieve content.

Additionally, a respective user may not be aware of which of multiple URLs are preferred sources from which to retrieve information. For example, unbeknownst to the user, the user may be able to retrieve data more quickly or efficiently from one source than another.

Techniques discussed herein deviate with respect to conventional applications such as those discussed above as well as other techniques known in the prior art. For example, in a specific embodiment as further described herein, a media player application includes a download manager. The download manager can provide functions such as selection of one or more pointers and retrieval of content over respective one or more network connections.

More specifically, a media player according to embodiments herein monitors a media feed (e.g., a web feed such as an RSS feed) for availability of newly published content available over a network. Via the feed, the media player can receive notification that certain retrievable content (e.g., the same content or substantially similar content) is available from multiple different locations over the network. The notification can include multiple pointers to the content. For example, a first pointer of the multiple pointers can identify a first remote location over the network in which to retrieve the content, a second pointer can identify a second remote location over the network in which to retrieve the content, and so on. An example of substantially similar same content is content that, when played back by a respective user on media player 155, provides at least a portion of the same or similar user experience.

The media player can receive a command or request from a user to download the content for playback. The command need not specify which pointer to use to retrieve the content. Instead, a download manager associated with the media player analyzes metadata associated with the multiple pointers to identify which of multiple types of download applications can be used to retrieve the content. For example, the download manager can identify that the first pointer requires use of a first particular type of download application on a respective computer system to retrieve the content from the first remote location, the download manager identifies that the second pointer requires presence of a second particular type of resident download application on the respective computer system to retrieve the content from the second remote location, and so on.

The media player and/or download manager track a presence of resident download applications on a computer system that are available to retrieve the content. Based on which download applications are present on the computer system, the media player identifies which of the multiple pointers can be utilized to retrieve content. For example, metadata associated with a first pointer may specify that the first pointer requires use of a corresponding download application not currently on the computer system. In such an instance, if the download application is not currently free, the media player identifies that the first pointer can't be used to retrieve the content. Metadata associated with a second pointer may specify that the second pointer requires use of a corresponding download application (e.g., a download application supporting peer-to-peer communications) that is currently present on the computer system. In such an instance, the media player identifies that the second pointer can be used to retrieve the content. This process of determining which pointers can be used to retrieve the content can be repeated for each pointer. Thus, depending on which download applications happen to be resident on a respective computer system, certain pointers can be used to retrieve the content (e.g., newly published content) as specified by the notification received on the media feed while other pointers in the received set of pointers cannot be used to retrieve the content.

As mentioned above, the media player can receive a command from a respective user to retrieve the content. In response to receiving such a command, the media player can apply one or more rules to identify a relative priority for retrieving the content via use of the multiple pointers. Based on application of the one or more priority rules and depending on which download applications are resident on a respective computer system, the media player selects a preferred pointer of the multiple pointers to retrieve the content. Based on use of the selected pointer, the media player initiates retrieval of the content over the network.

In one embodiment, the set or multiple pointers received by the media player can include different pointers for retrieving data over different types of network connections. For example, one pointer in the set of pointers can specify an address of a remote server that supports peer-to-peer communications to forward the content over a network to the media player for viewing by a respective user. Another pointer in the set can specify an address of a remote server that client-server communications over a non peer-to-peer connection for retrieval of content such as a standard client-server network connection. Retrieval of the content over the peer-to-peer connection may be preferred.

Note that a publisher of the content can create the set of pointers and corresponding metadata that are forwarded to the media player. As discussed above, the media player can utilize the metadata associated with the pointers to identify a preferred priority for retrieving the data from the remote locations as specified by the pointers. For example, the publisher may include priority information (e.g., metadata) with the set of pointers to specify that use of a particular pointer supporting communications over a peer-to-peer network connection is preferred because it is has a higher priority. Use of a preferred pointer as specified by the publisher can reduce costs associated with distributing content, provide increased download bandwidth for a respective user, enable the user to retrieve content having more features as enhanced definition, etc. Note that non-preferred pointers can enable downloading of content via a standard web connection.

These and other embodiments will be discussed in more detail below.

Note that embodiments herein can include a configuration of one or more computerized devices, workstations, handheld or laptop computers, or the like to carry out and/or support any or all of the method operations disclosed herein. In other words, one or more computerized devices or processors can be programmed and/or configured to include a download manager and/or related functions as explained herein to carry out different embodiments of the invention.

Yet other embodiments herein include software programs to perform the steps and operations summarized above and disclosed in detail below. One such embodiment comprises a computer program product that has a computer-readable medium (e.g., a tangible computer readable media) including computer program logic encoded thereon that, when performed in a computerized device having a processor and corresponding memory, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes a computer readable medium having instructions stored thereon for supporting operations such as providing download management functions. The instructions, and thus method as described herein, when carried out by a processor of a respective computer device, cause the processor to: i) receive multiple pointers to content stored at multiple different locations over a network based on monitoring a media feed; ii) identify a presence of resident download applications that are available to retrieve the content; iii) select a pointer of the multiple pointers to retrieve the content depending on the presence of the resident download applications; and iv) initiate retrieval of the content over the network based on communications with a content server as specified by the selected pointer. The numbering of the previous steps has been added for clarity sake, these steps need not be performed in any particular order.

Other embodiments of the present disclosure include software programs to perform any of the method embodiment steps and operations summarized above and disclosed in detail below.

Also, it is to be understood that the system, method and apparatus herein can be embodied strictly as a software program, as a hybrid of software and hardware, or as hardware alone such as within a processor, or within an operating system or within a software application. Example embodiments of the invention may be implemented within products and/or software applications such as those manufactured by Adobe Systems, Inc. of San Jose, Calif., USA.

As discussed above, techniques herein are well suited for use in software applications implementing download functionality such as those associated with media player applications that playback content to a respective computer user. However, it should be noted that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

FIG. 4 is an example diagram of download status page illustrating download status information according to embodiments herein.

DETAILED DESCRIPTION

Figure 1:
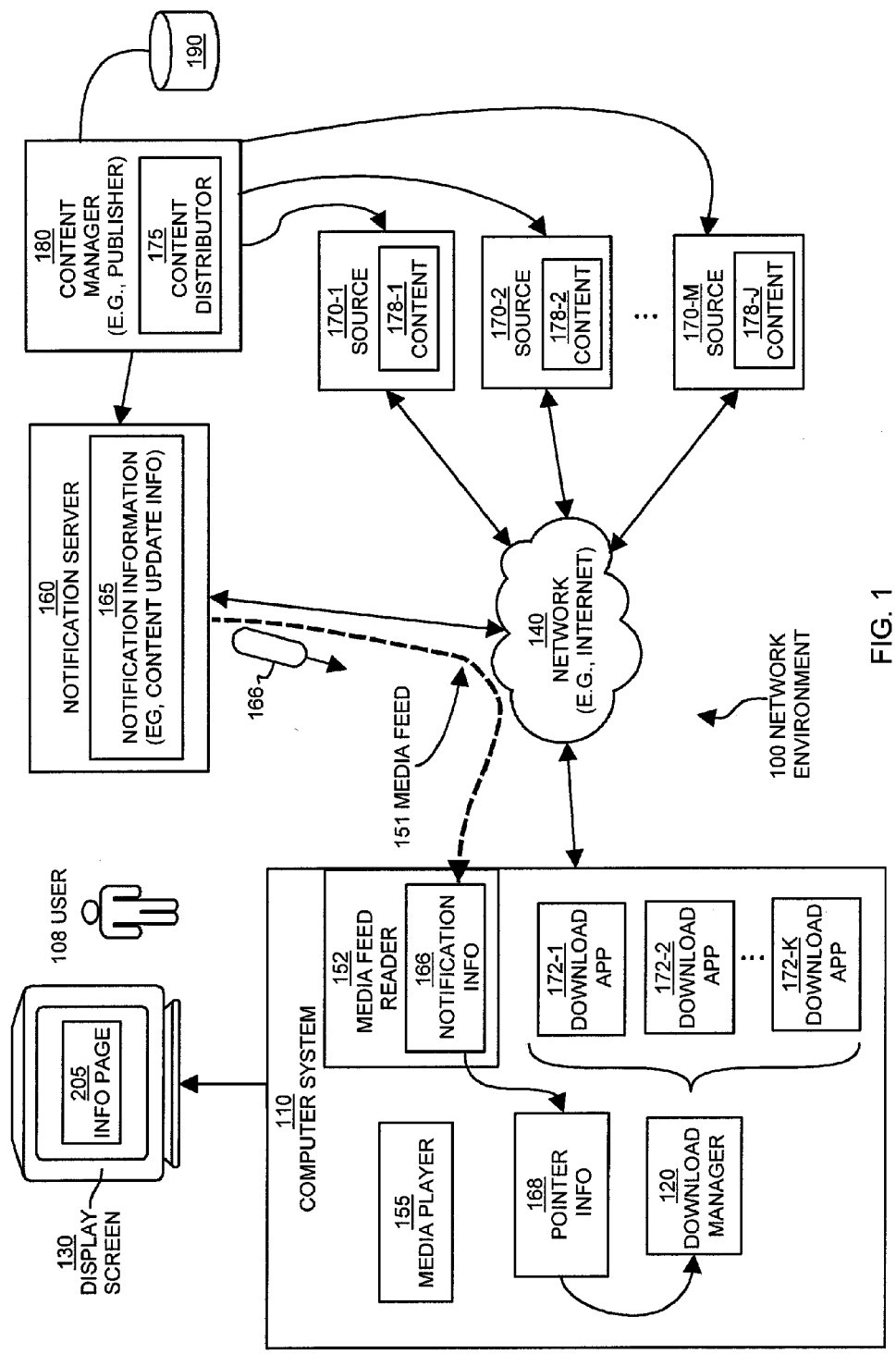
FIG. 1 is an example diagram of a computer environment supporting according to embodiments herein.

According to an example embodiment as described herein, a media player monitors a media feed (e.g., a web feed) for availability of newly published content. Via the feed, the media player can receive notification that certain retrievable content (e.g., the same content or substantially similar content) is available from multiple different locations over one or more different types of network connections. For example, the notification can include a description of available content as well as a set of multiple pointers that can be used by the media player to retrieve the content. A first pointer of the set of pointers can identify a first remote location over the network in which to retrieve the content, a second pointer can identify a second remote location over the network in which to retrieve the content, and so on. The media player can have an associated download manager that selects an appropriate one of the pointers to retrieve the content depending on publisher specified priority information and which of one or more download by applications resides on a computer system.

The media player and/or download manager tracks a presence of resident download applications on a computer system that are available to retrieve content. Based on which download applications are present on the computer system, the media player identifies which of the multiple pointers in the received set of pointers can be utilized to retrieve content. For example, metadata associated with a first pointer may specify that the first pointer requires use of a corresponding download application not currently on the computer system. In such an instance, the media player identifies that the first pointer can't be used to retrieve the content. Metadata associated with a second pointer may specify that the second pointer requires use of a corresponding download application (e.g., a download application supporting peer-to-peer communications) that is currently present on the computer system. In such an instance, the media player identifies that the second pointer can be used to retrieve the content. This process of determining which pointers can be used to retrieve the content can be repeated for each pointer. Thus, depending on which download applications happen to be resident on a respective computer system, certain pointers can be used to retrieve the content (e.g., newly published content) as specified by the notification received on the media feed while other pointers in the received set of pointers may not be used to retrieve the content.

In addition to identifying which pointers can be used to retrieve content, the download manager can be configured to select which of the pointers to retrieve content based on a set of priority rules. For example, the ordering of the pointers in a list may indicate priority. In such an instance, the first pointer in the list may be the most preferred pointer in which to retrieve the content, the second pointer in the set may be the next preferred pointer in which to retrieve content, and so on. In further embodiments, the pointers can also be marked by a respective publisher to indicate their respective priority. Pointers supporting retrieval of the content over peer-to-peer network may be preferred over use of pointers in the set that supports retrieval of the content via a standard client-server connection. Thus, the type of download application associated with a respective pointer can be a factor determining which of the multiple pointers to use to retrieve the content.

FIG. 1 is an example block diagram of an environment 100 supporting management and distribution of media content according to embodiments herein. In general, a content manager 180 (e.g., a publisher) creates, publishes, and/or manages content (e.g., audio, video, advertisement, etc.) for storage and distribution over one or more networks such as network 140 (e.g., the internet, wide area network, local area network, etc.).

The content manager 180 utilizes media resources 190 to create one or more playback experiences for playback on corresponding media players. Note that network environment 100 can include multiple computer systems, each of which operates in a similar manner as computer system 110 to retrieve and playback content.

In one embodiment, the content manager 180 associated with computer system 110 utilizes the media resources 190 to create content 178 (e.g., content 178-1, content 178-2, . . . content 178-J) and define a multi-media experience via creation of. After creation of the content, the content manager 180 initiates distribution of the content 170 via content distributor 175.

The content 178 stored at sources 170 can be raw data stored in a format such as ".flv", "mp3", etc. When retrieved, media player 155 can decode and playback the data for respective user 108. Thus, via playback of content 178, the user 108 can listen to music via speakers associated with computer system 110, view static or moving images on display screen 130, etc.

In addition to possibly being raw, playable data, note that the content 178 stored at sources 170 (e.g., servers or data distribution nodes) can include content playback files (e.g., playlists in the form of a ".mod" file), each of which defines a playback experience when executed by the media player 155. For example, the content manager 180 (e.g., a publisher) can create a content playback file using a tag-based format such as eXtensible Markup Language "XML" file, Synchronous Media Instruction Language "SMIL" file, etc. The content playback file can includes references (e.g., additional address information such as URLs) to raw data for retrieval and playback by the media player 155. Additional details associated with playback of content playback files and raw data can be found in earlier filed U.S. patent application Ser. No. 11/879,347 entitled "MEDIA FEEDS AND PLAYBACK OF CONTENT," filed on Jul. 17, 2007, the entire teachings of which are incorporated herein by this reference.

Thus, according to embodiments herein, content 178 stored in sources 170 can include various types of playable media such as video files, audio files, links to audio/video data, documents, etc. as well as playlists specifying how to play back content for the user 108.

As mentioned, after creating the content playback file and/or raw data defining a playback experience, the content manager 180 stores the content 178 at sources 170. For instance, FIG. 1 shows an example embodiment where the content manager 180 stores the content 178-1 at source 170-1. Similarly, as shown in FIG. 1, the content manager 180 stores content 178-2 at source 170-2 and content 178-J at source 170-M.

The content 178 stored at sources 170 can be the same content or substantially similar content for retrieval by user 108. Thus, a respective user can retrieve the content from multiple different addresses over network 140 to view the same or similar content.

Each of sources 170 may support the same or different data transmission protocol, data encoding protocol, etc. for transmitting the content over network 140 to the computer system 110 for playback by media player 155. For example, source 170-1 can be configured to support downloading of content to computer system 110 according to a first particular protocol, type of communicate link, data transmission rate, etc.; source 170-2 can be configured to support downloading of content to computer system 110 according to a second particular protocol, type of communicate link, data transmission rate, etc.; source 170-J can be configured to support downloading of content to computer system 110 according to a third particular protocol, type of communicate link, data transmission rate, etc., and so on.

In addition to distributing content 170 via content distributor 175, content manager 160 (or some other resource) initiates storage of notification information 160 (e.g., content update information) at notification server 160. In one embodiment, the notification information 165 includes information regarding updates to newly available content such as the content 178 stored at sources 170. Further details associated with the notification information are discussed below.

Computer system 110 can be apprised of newly available content by monitoring media feed 151. In one embodiment, the computer system subscribes to the media feed 151 and receives information from the media feed 151 via media feed reader 152 (e.g., an RSS aggregator). The term RSS is an acronym for Really Simple Syndication, which is a standard for providing notification to subscribers of newly available content. Example syndication formats for providing notification include RSS formats 1.0, 2.0, and Atom 1.0. However, note that any suitable format for receiving notification of available can be used to exploit the method, system, etc. as described herein.

The information received on the media feed 151 by the media feed reader 152 includes content update information distributed by the content manager 180.

Via transmission of messages 166 over the media feed 151, the media feed reader 152 receives the notification information 166. The media player 155 can process the notification information 165 received from server 160 and subsequently initiate display of a corresponding information page 205 on display screen 130. Thus, according to embodiments herein, the user 108 can be apprised of different content 178 that is available for playback on media player 155.

Figure 2:
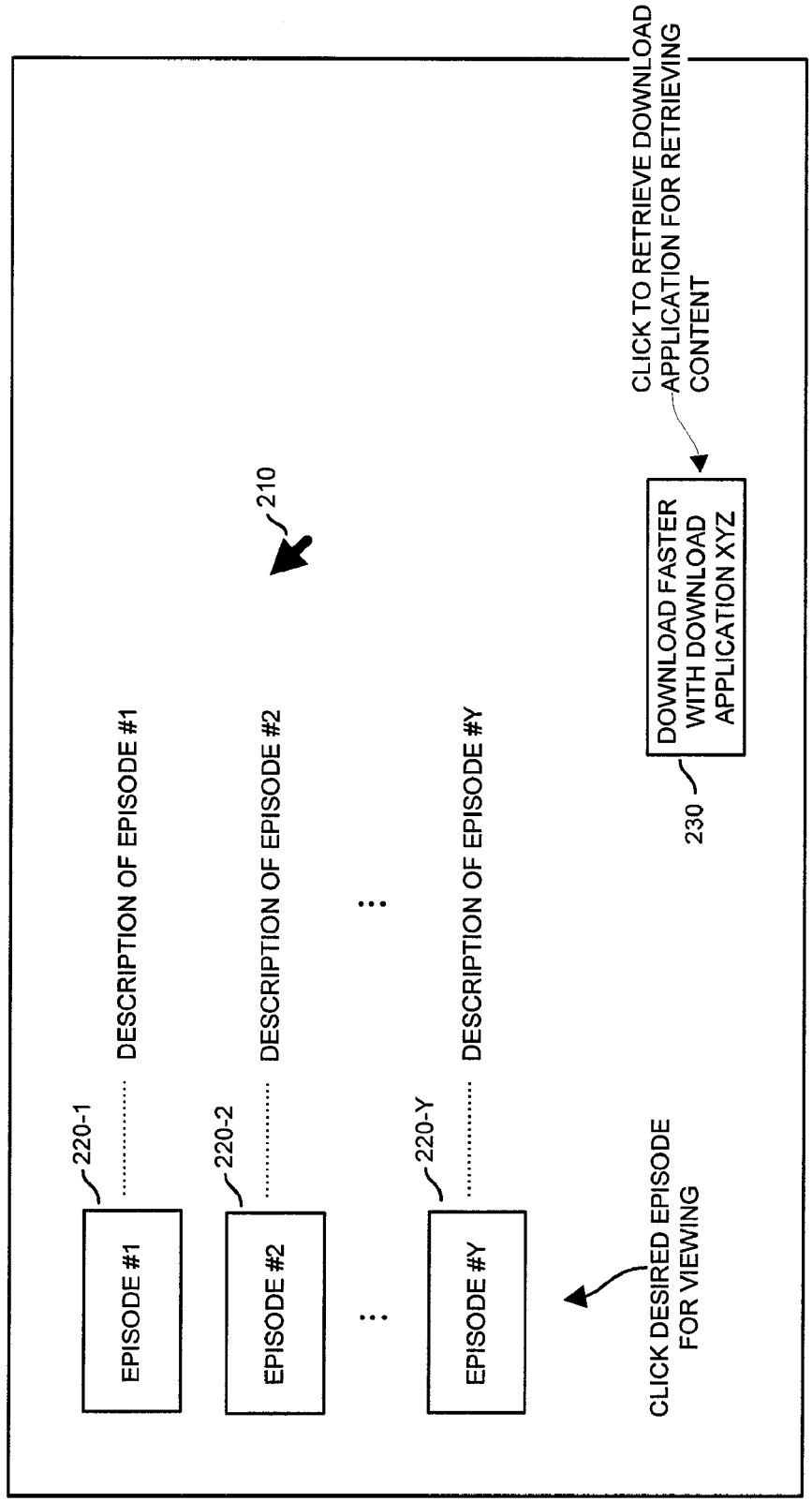
FIG. 2 is an example diagram illustrating selection of one or more pointers and retrieval of content from one or more remote locations according to embodiments herein.

FIG. 2 is diagram illustrating an example information page 205 according to embodiments herein. As shown, the information page 205 displayed by media player 155 on display screen 130 notifies the user 108 of the available content. For example, the information page 205 (e.g., a web page) notifies the user that episode #1, episode #2, . . . , episode #Y of a particular show are available for viewing.

Note that the received notification information 165 can include description information associated with the available content for display on information page 205 in order to provide the user 108 with a brief over describing the retrievable content. The media player 155 initiates display of the description information next to the appropriate episode.

To initiate playback of content, a respective user 108 utilizes cursor 210 (e.g., as controlled by a computer mouse) to click (e.g., select) on a respective viewing region 220 (e.g., viewing region 220-1, viewing region 220-2, . . . , viewing region 220-Y). In response to receiving a user selection, the media player 155 initiates retrieval of content selected by the user 108 based on the pointer information 165 as discussed below.

Referring again to FIG. 1, the received notification information 165 can include pointer information 168 specifying from which sources 170 the corresponding content associated with each episode can be retrieved. For example, in one embodiment, the pointer information 168 as shown in FIG. 1 includes pointers and corresponding metadata.

The pointers specify respective addresses of corresponding sources 170 from which given content can be retrieved.

The metadata associated with the pointers specifies parameters such as which types of download applications can be used to retrieve the content from the different sources. Based on the metadata, the download manager 120 can identify which type of multiple download applications 172 (e.g., download application 172-1, download application 172-2, download application 172-K) must be used to retrieve the content from a particular source 170.

Based on processing of the metadata associated with pointer information 168 as well as an assessing which of multiple types of download applications are resident on computer system 110 for retrieving content, the download manager 120 can determine which of the pointers can be used to retrieve the content stored at sources 170.

If the download manager 120 determines that certain content (e.g., content 178 associated with one or more episodes) requires use of a particular download application that is not currently resident on computer system 110, the download manager 120 can initiate display of viewing region 230 on the information page 205 (as detailed in FIG. 2) to notify the user of an available download application that can provide faster downloading for the available content. Thus, the download manager 120 can apprise the user 108 of the different options available for downloading content for a given publisher.

Figure 3:
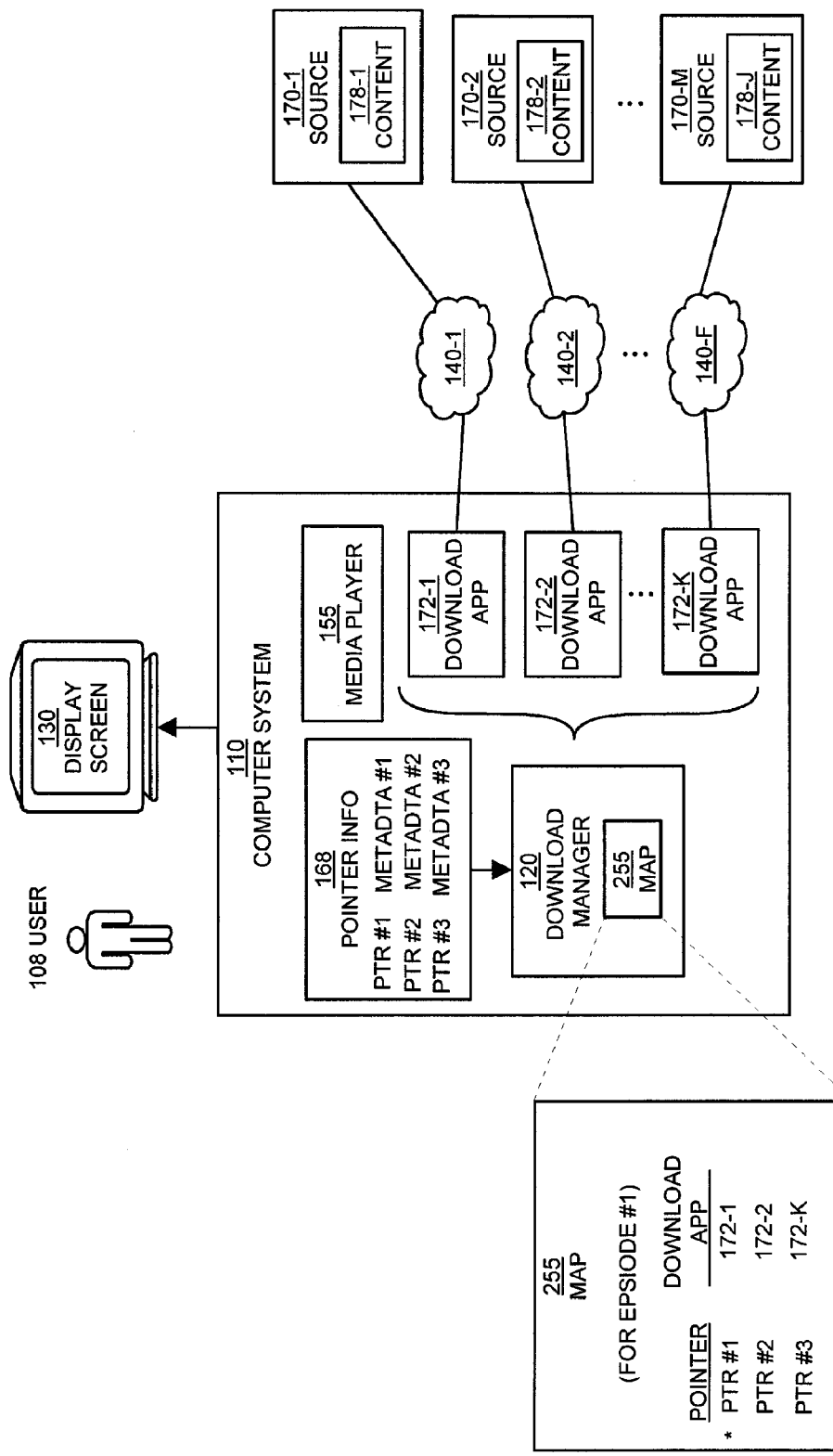
FIG. 3 is an example diagram of an information page indicating available content and one or more download applications according to embodiments herein.

FIG. 3 is an example diagram illustrating use of pointer information 168 to retrieve content according to embodiments herein. Assume in this example that the media player 155 receives a request from an entity such as user 108 to retrieve content 178 (e.g., episode #1 as displayed in information page 205). Upon receiving the request, the media player 155 notifies the download manager 120 of the content 178 to be retrieved.

Note that in this example embodiment because the download manager 120 processes the pointers, the user 108 has no knowledge of the different pointers that can be used to retrieve the content, just that the content can be retrieved for playback by media player 155 as displayed on information page 205. Instead of the user 108 selecting a particular pointer to use to retrieve the selected content form one of the multiple sources 170, the download manager 120 is configured to make a determination of which of multiple pointers and corresponding download applications 172 resident on the computer system 110 will be used to retrieve the content. Thus, embodiments herein include a download manager 120 configured to automatically select a pointer and initiate retrieval of the content in response to receiving a "generic" request for retrieval of the content in which the generic request or associated user input does not provide an indication which of the multiple different locations the content must be retrieved.

For example, assume that the notification information 165 indicates that content 178 (e.g., episode #1) can be retrieved using pointers PTR#1, PTR#2, or PTR#3. An example of pointers and corresponding metadata provided over a media feed (e.g., using syntax according to a Media RSS standard) is shown below:

<media:group>
<media: content url="http://www.nbc.com/heroes/flv/Heroes-Episode1.flv" type="application/x-p2pcorp; enclosed=video/x-flv" is Default="true"/>
<media: content url="http://www.nbc.com/heroes/flv/Heros-Episode1.flv" type="application/x-filesharecorp; enclosed=video/x-flv" is Default="false"/>
<media: content url="http://www.nbc.com/heroes/flv/Heroes-Episode1.flv" type="video/x-flv" is Default="false"/>
</media: group>

In some embodiments, the URL attribute for stored content will be the same for all representations of a piece of content as indicated above. In other embodiments, the URL attribute will differ for these representations. For example, the Kontiki P2P system from Verisign expects the URL attribute to be in a different syntax form such as URN:xxxx.xxxx.xxxx." Also, as mentioned above, each pointer can point to a different network address.

Use of the default value=TRUE in the example above can specify the preferred pointer (e.g., URL or other address value). The metadata associated with each respective pointer specifies a type of download application for retrieving the content.

In one embodiment, if no particular default is specified, the ordering of the pointers in a respective list can indicate a preferred order in which to retrieve the content over network 140.

As an alternative to ordering, metadata associated with the pointers can indicate which of the pointers should be used as a default pointer for retrieve the content. If use of the default pointer fails and cannot be used to retrieve the content, the download manager 120 can select another pointer to attempt retrieval of the content. If this latter pointer fails, the download manager 120 can select another pointer to attempt retrieval of the content, and so on. Thus, embodiments herein include cycling through use of the multiple pointers and selecting another pointer from the multiple pointers to retrieve the content in response to detecting that retrieval of the content using the selected pointer failed. Cycling can take into account the relative priority of the pointers.

In addition to ordering, the metadata information associated with the pointers can specify a type of download application that can be used to download the content from the sources. Recall that content 178-1, content 178-2, . . . , content 178-J each provide the same or similar multimedia experience when played back to the user 108. However, note that the computer system 110 may not be configured with the appropriate download applications to retrieve the content as required by the pointers. Consequently, if a corresponding download application 172 associated with a given pointer does not currently reside on computer system 110, the download manager 120 will not be able to use the given pointer to retrieve the content. In such an instance, the download manager 120 will select another pointer that can be used to retrieve the content.

In the present example, recall that the download manager 120 receives pointers PTR#1, PTR#2, and PTR#3 as well as corresponding metadata. Assume in this example that the corresponding metadata indicates that PTR#1 represents an address pointing to content 178-1 stored in source 170-1, PTR#2 represents an address to content 178-2 stored in source 170-2, and PTR#3 represents an address to content 178-J stored in source 170-M. Assume further that the corresponding metadata indicates that download application 172-1 can be used to retrieve content 178-1 over network 140-1 (e.g., a first type of network connection such as a peer-to-peer type network connection) from source 170-1 via PTR #1, download application 172-2 can be used to retrieve content 178-2 over network 140-2 (e.g., a second type of network connection such as a client-server network connection supporting HTTP) from source 170-2 via PTR#2, and download application 172-K can be used to retrieve content 178-J over network 140-F (e.g., a third type of network connection) from source 170-M via PTR#3.

In this example, the download manager 120 can use any of the pointers PTR#1, PTR#2, and PTR#3 to retrieve the content 178. However, note that use of certain pointers may be preferred over use of others. Recall that a publisher can specify the pointers and corresponding metadata. Accordingly, the publisher associated with the content can specify an ordering to apply the pointers and a preference of using one pointer (or download application) versus another.

As an example, the notification information 165 may specify that pointer PTR#1 is preferred over PTR#2 and PTR#3 because it enables quicker retrieval of content 178 because the download manager 120 downloads the content over a peer-to-peer (e.g., P2P) type of network as opposed to a classical client-server type connections. A peer-to-peer connection may be preferred because a peer-to-peer network includes diverse connectivity between participants and a common data source, thus, avoiding bottlenecks sometimes found in client-server type network connections.

From the perspective of a publisher who makes the content available over network 140, use of the peer-to-peer network may be preferred because it reduces overall costs to distribute the content, enables the publisher to provide enhancements to content not possible by other download applications, provides a quicker way to download content, etc. The download manager 120 can be configured to select a particular pointer that is used to download the content via a peer-to-peer connection in lieu of selecting a pointer that supports downloading of the content via a client-server connection.

Thus, certain embodiments herein can include a download manager 120 configured to track the presence of resident download applications for purposes of detecting whether a peer-to-peer download application is resident to the computer system for retrieving requested content. Based on priority as specified by the publisher or other entity, the peer-to-peer download connection may be a preferred way to retrieve content. In such an embodiment, if download application 172-1 was the only download application supporting peer-to-peer network connections, then the download manager would select PTR1 for retrieving the content 178 over network 140-1. To carry out a download in this example, the download manager 120 would communicate or forward the PTR#1 to the download application 172-1 (e.g., the peer-to-peer download application). The download application 172-1, in turn, retrieves the content 178-1 over network connection 140-1 (e.g., a peer-to-peer network connection).

Note that the download manager 120 can implement other types of rules to identify a relative priority for retrieving the content via use of the multiple pointers. Recall that the download manager 120 can utilize a relative ordering of pointers in a list to identify priority. In another embodiment, the download manager 120 can be configured to select a pointer that supports the quickest retrieval from a respective source. In such an embodiment, the download manager 120 can monitor an ability to download content over the different download applications 172 and select the download application providing the best throughput based on current operating conditions. The download manager 120 can be configured to monitor other parameters as well in order to make a determination of which pointer to use.

In yet other embodiments, the download manager 120 can be configured to select a respective one of multiple pointers depending on which of multiple download applications is preferred by the user 108. In such an embodiment, the user can configure the media player 155 with the user's preferred settings such as which download applications are preferred for downloading content over others.

Note again that the pointer information 165 may specify one or more pointers (associated with the requested content) that do not have a corresponding download application 172 resident on computer system 110 to download content from a corresponding source 170. In such an embodiment, the download manager 120 cannot retrieve content using the non-resident, but needed download applications. As previously discussed, information page 205 can include a notification displayed to the user 108 that a non-resident download application such as download application XYZ is available over the network for retrieving content in the future.

Accordingly, a download manager 120 according to embodiments herein can be configured to identify which of multiple pointers cannot be used to retrieve requested content because a corresponding download application is not resident on the computer system and, thereafter, initiate display of a notification on the display screen 130 of computer system to indicate availability of the corresponding download application for installing on the computer system. As previously discussed, in response to receiving a command (e.g., selection of viewing region 230 with cursor 210) to retrieve the not yet installed download application, the download manager 120 initiates communication over the network 140 to install the corresponding download application on the computer system. The newly installed download application can then be used for subsequent downloading of data from remote locations over the network 140.

Some P2P clients may require additional parameters to be passed through during a respective retrieval of content. For example, the P2PCorp client (e.g., a respective source 170) might require that publishers include a customer ID for billing. Because such parameters are P2P client-specific, they can be included as parameters in the metadata (e.g., <media:content>) associated with a respective pointer.

For example, if the <media:content> element's type field contains "application/x-p2pcorp;enclosed=video/x-flv; id=1234", then a name-value pair of "id" and "1234" can be passed from a respective download application to the P2P client when that piece of content is downloaded.

As previously discussed, the download manager 120 can forward the pointers to download applications 172 to initiate downloading of content from a remote site.

Thus, according to embodiments herein, the download manager 120 can provide received publisher identity information to a resident download application being used to download the content. The identity information can be provided by the publisher in the metadata associated with the pointers. For example, the metadata associated with the pointers can include identity information of associated with the publisher that should be forwarded to the server when content is downloaded. Accordingly, a respective source 170 distributing the content can identify which publisher's content is being distributed and generate appropriate billing to the publisher, client, etc.

In further embodiments, note that the download manager 120 can be configured to forward identity information associated with a client that is retrieving the content from the remote location over network 140. Based on receipt of such information, the publisher, network provider, and/or content distributor can charge the user for downloading the content.

FIG. 4 is an example diagram illustrating an information page 410 displayed by the download manager 120 to a respective user 108 according to embodiments herein. As shown, the user 108 can select different content for retrieval from remote network addresses at the same time without waiting to complete download of content from a particular source.

Information page 410 (for display on display screen 130) includes a list of different content requested by a user as well as corresponding status information associated with the content currently being downloaded. For example, column 420-1 indicates a relative ordering of when corresponding content was selected for downloading. Column 420-2 indicates a title of the content being downloaded. Column 420-3 specifies the series to which the tile pertains. Thus, via column 420-2 and column 420-3, the user 108 can identify the television show and corresponding episode being downloaded. Column 420-4 includes a progress bar indicating a relative amount of a total program that has been downloaded. The progress bars can be color coded to indicate whether the download has failed or not. For example, a red progress bar can indicate that the download has failed. A green progress bar indicates that the download is still in progress and has not failed. Column 420-5 indicates whether a selected item is actively downloading, queued, failed downloading, paused, etc. Column 420-6 indicates and estimated time of completing a download. Column 420-7 indicates a file size of the in the item being downloaded. Column 420-8 indicates the play length of a respective item. Accordingly, a respective user can view progress associated with each item in the listing being downloaded.

In one embodiment, the user 108 can apply different commands to the items shown in information page 410. For example, the user can pause a download, abort a download, etc. Thus, in some respects, information page 410 is a management tool for use by the user to manage downloads of content.

As discussed above, the download manager 120 can attempt a download using one or more pointers associated with each respective item selected for downloading. For example, the first item (e.g., content entitled "Last Stand") selected for downloading by the user can have an associated set of pointers used by the download manager 120 to retrieve corresponding content. As mentioned above, the first row status information of information page 410 (e.g., the row of information associated with "Last Stand") indicates a current status of downloading the corresponding content. If downloading via initially selected pointer happens to fail, the download manager 120 can reattempt retrieval of the content with a different pointer (e.g., a pointer having a next highest priority) in the associated set of pointers. This process can be repeated until the download manager 120 finds a pointer that can be used to retrieve the requested content. Information page 410 can be expanded to include status information indicating which pointers fail. Accordingly, a user can identify which download application and connection type is not working properly. If the download manager 120 tries all pointers, all of which fail, the download manager 120 can provide an indication of the failure via display of information page 410.

Figure 5:
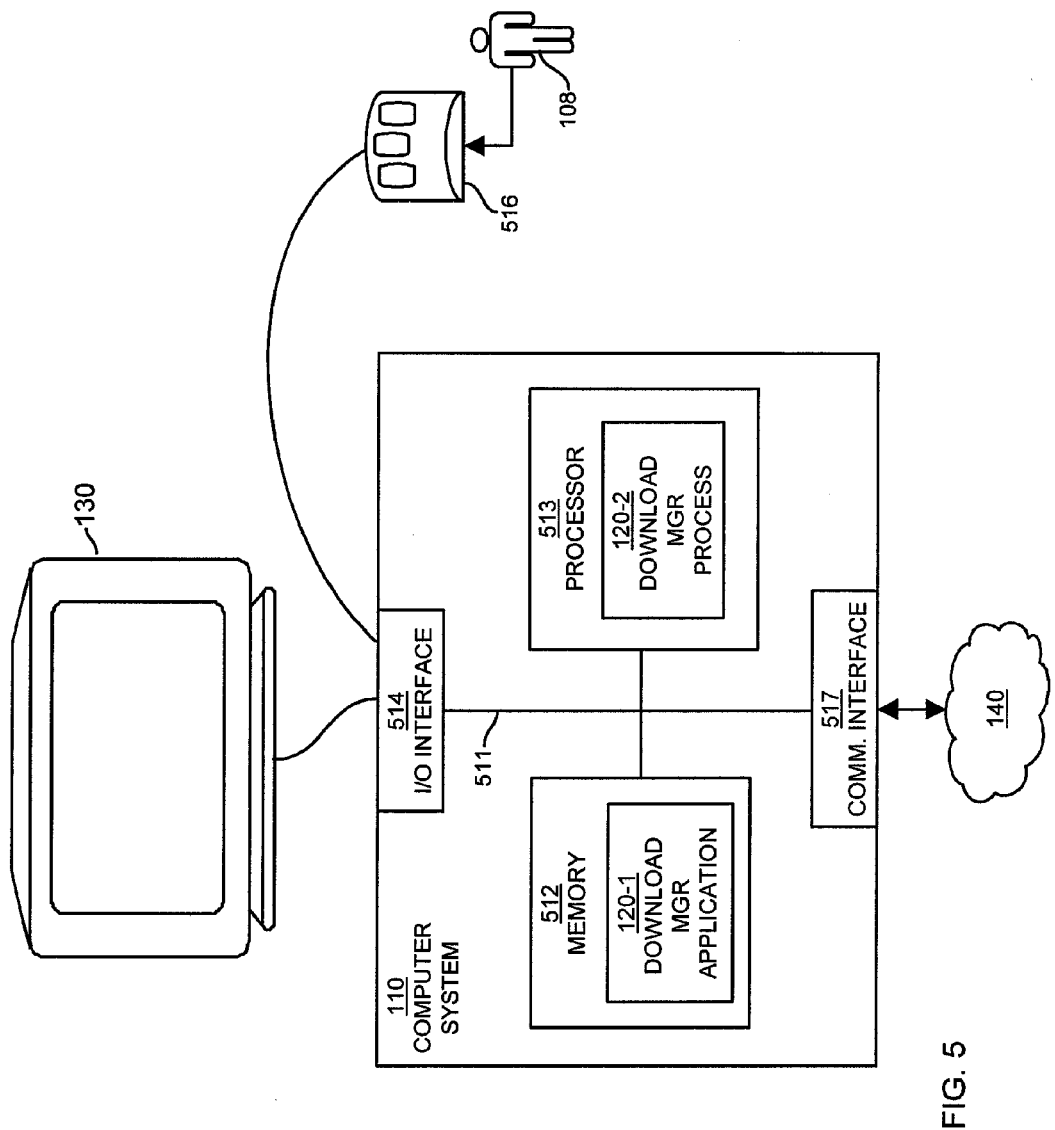
FIG. 5 is a diagram of an example architecture for executing software code according to embodiments herein.

FIG. 5 is a block diagram of an example architecture of a respective computer system 110 for implementing a download manager 120 (e.g., a download manager application 120-1 and/or download manager process 120-2) according to embodiments herein. Computer system 110 can be a computerized device such as a personal computer, workstation, portable computing device, console, network terminal, processing device, network device, etc.

Note that the following discussion provides a basic embodiment indicating how to carry out functionality associated with the download manager 120 as discussed above. However, it should be noted that the actual configuration for carrying out the download manager 120 can vary depending on a respective application.

As shown, computer system 110 of the present example includes an interconnect 511 that couples a memory system 512, a processor 513, I/O interface 514, and a communications interface 517.

I/O interface 514 provides connectivity to peripheral devices 516 (if such devices are present) such as a keyboard, mouse (e.g., selection tool to move cursor 210), display screen 130, etc. User 108 can provide input to computer system 110 to select content for downloading. Communications interface 517 enables download manager 120 of computer system 110 and, more particularly, download applications 172 to communicate over network 140 to retrieve requested content.

As shown, memory system 512 is encoded with download manager application 120-1 that supports functionality as discussed above and as discussed further below. Download manager application 120-1 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor 513 accesses memory system 512 via the use of interconnect 511 in order to launch, run, execute, interpret or otherwise perform the logic instructions of the download manager application 120-1. Execution of the download manager application 120-1 produces processing functionality in download manager process 120-2. In other words, the download manager process 120-2 represents one or more portions of the download manager application 120-1 performing within or upon the processor 513 in the computer system 110.

It should be noted that, in addition to the download manager process 120-2 that carries out method operations as discussed herein, other embodiments herein include the download manager application 120-1 itself (i.e., the un-executed or non-performing logic instructions and/or data). The download manager application 120-1 may be stored on a computer readable medium (e.g., a repository) such as a floppy disk, hard disk or in an optical medium. According to other embodiments, the download manager application 120-1 can also be stored in a memory type system such as in firmware, read only memory (ROM), or, as in this example, as executable code within the memory system 512 (e.g., within Random Access Memory or RAM).

In addition to these embodiments, it should also be noted that other embodiments herein include the execution of the download manager application 120-1 in processor 513 as the download manager process 120-2. Thus, those skilled in the art will understand that the computer system 110 can include other processes and/or software and hardware components, such as an operating system that controls allocation and use of hardware resources.

Functionality supported by computer system 110 and, more particularly, functionality associated with download manager application 120-1 and download manager process 120-2 will now be discussed via flowcharts in FIGS. 6 through 8. For purposes of the following discussion, the download manager 120 (e.g., download manager application 120-1 and/or download manager process 120-2) or other appropriate entity in environment 100 generally performs steps in the flowcharts.

Note that there will be some overlap with respect to concepts discussed above for FIGS. 1 through 5. Also, note that the steps in the below flowcharts need not always be executed in the order shown.

Figure 6:
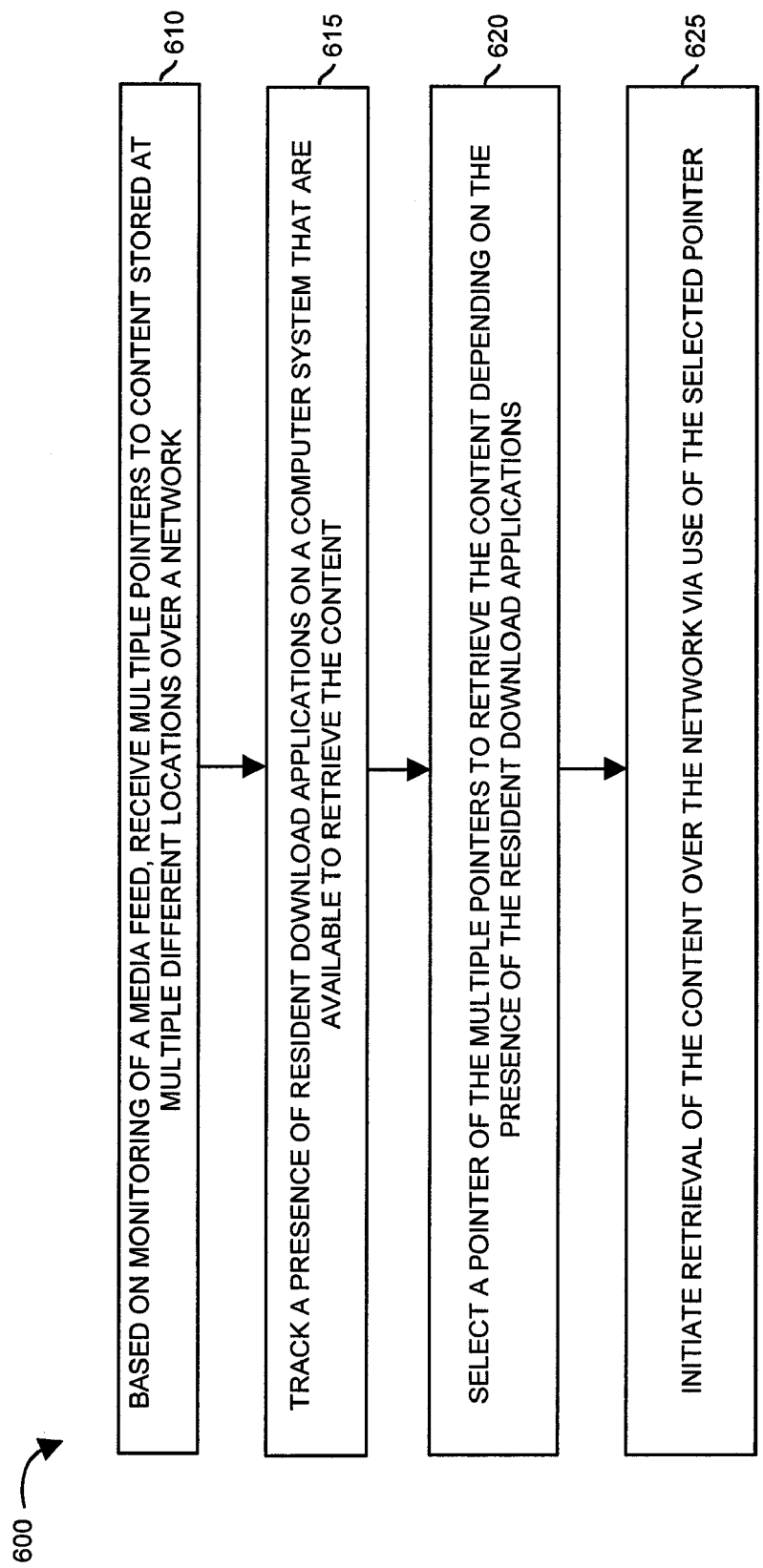
FIG. 6 is a flowchart illustrating an example of a method for selecting a pointer for downloading of content according to embodiments herein.

FIG. 6 is a flowchart 600 illustrating a technique of implementing a download manager and related functionality according to embodiments herein. Note that flowchart 600 of FIG. 6 and corresponding text below may overlap with and refer to some of the matter previously discussed with respect to FIGS. 1-5. Also, in addition to download manager 120, note that the steps in flowchart 600 can be performed by additional entities such as computer system 110, media player 155, etc.

In step 610, based on monitoring of a media feed 151 by media feed reader 152, the download manager 120 receives multiple pointers to content stored at multiple different locations (e.g., sources 170) over a network 140.

In step 620, the download manager 120 tracks a presence of resident download applications on computer system 110 that are available to retrieve the content 178.

In step 630, the download manager 120 selects one or more pointers of the multiple pointers to retrieve the content depending on the presence of the resident download applications. As previously discussed, selecting amongst the pointers can occur automatically (and unbeknownst to the user) by a software function in response to receiving a request for content 178.

In step 640, the download manager 120 initiates retrieval of the content 178 over the network 140 via use of a selected pointer.

Figure 7:
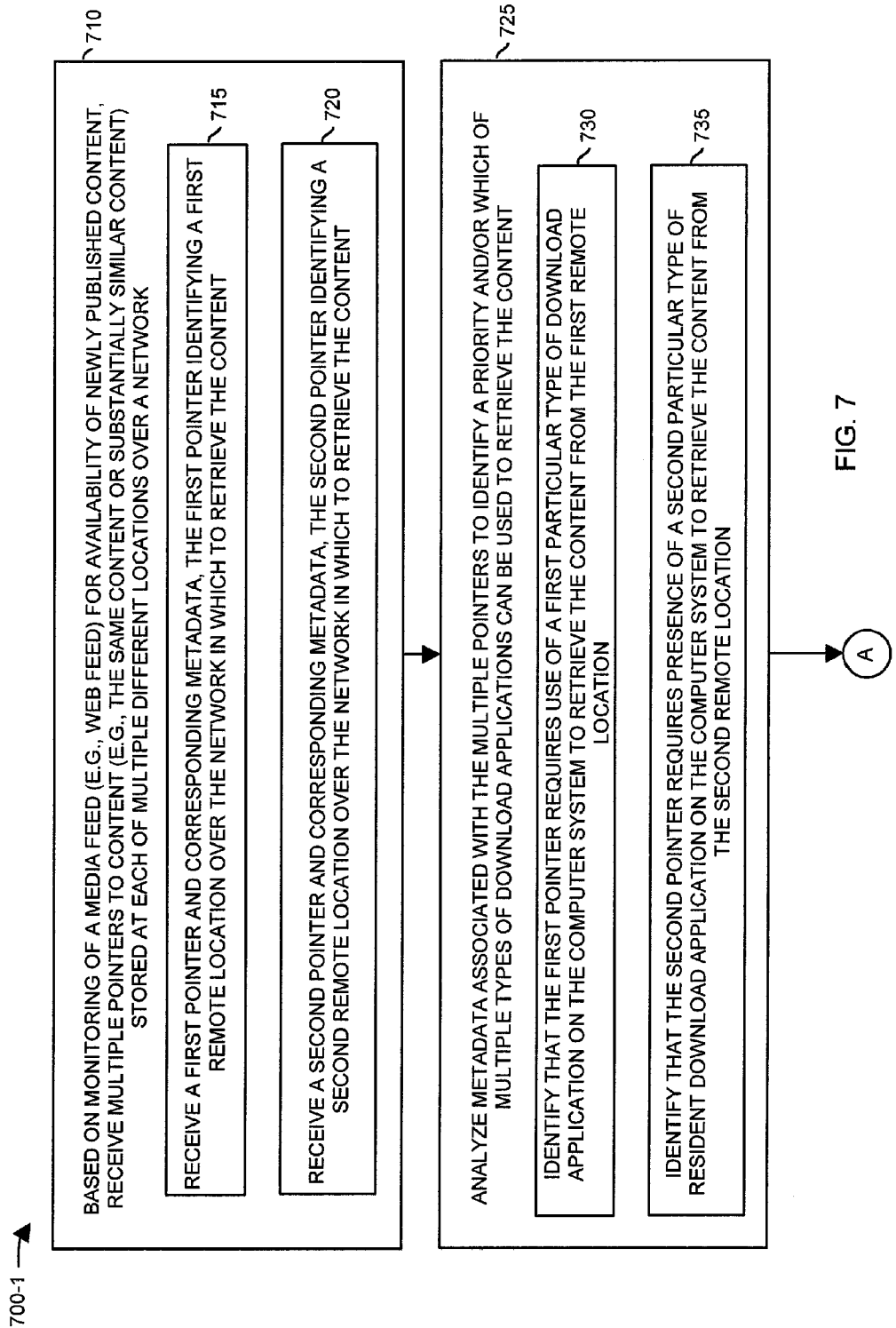
FIGS. 7 and 8 combine to form a flowchart illustrating an example of a method to for retrieval of data according to embodiments herein.
Figure 8:
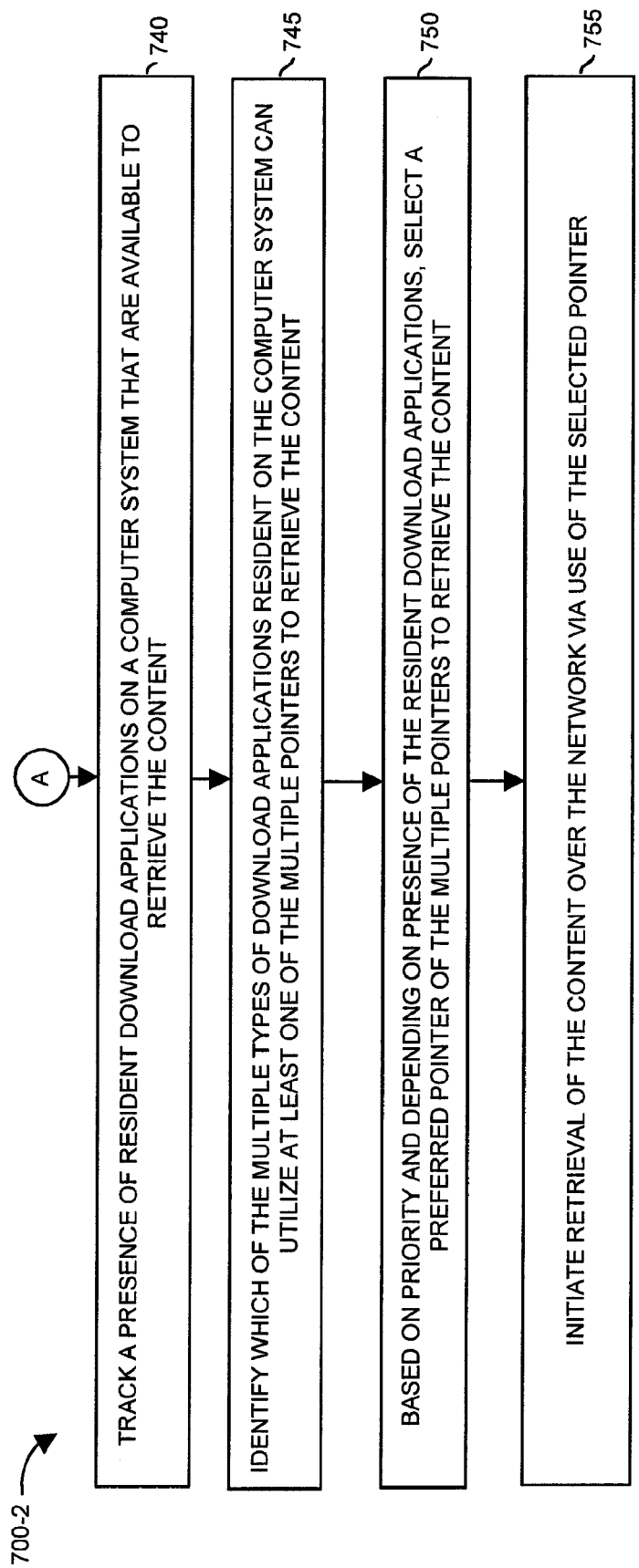

FIGS. 7 and 8 combine to form a flowchart 700 (e.g., flowchart 700-1 and flowchart 700-2) illustrating a technique facilitating retrieval of content according to embodiments herein. Note that flowchart 700-1 and 700-2 and corresponding text below will make reference to and may overlap with matter previously discussed with respect to FIGS. 1-5.

In step 710, based on monitoring of a media feed 151 (e.g., web feed) for availability of newly published content, the computer system 110 receives multiple pointers (e.g., pointer information 168) to content 178 (e.g., the same content or substantially similar content) stored at each of multiple different locations (e.g., source 170) over a network 140.

In substep 715, the media feed reader 152 receives a first pointer and corresponding metadata. The first pointer identifies a first remote location over the network in which to retrieve the content 178.

In substep 720, the media feed reader 152 receives a second pointer and corresponding metadata. The second pointer identifies a second remote location over the network in which to retrieve the content.

In step 725, the download manager 120 analyzes the metadata (e.g., publisher provided metadata) associated with the multiple pointers to identify a priority and/or which of multiple types of download applications 172 can be used to retrieve the content 178.

In substep 730, the download manager 120 identifies that the first pointer (e.g., PTR #1) requires use of a first particular type of download application on the computer system 110 to retrieve the content from the first remote location (e.g., source 170-1).

In substep 735, the download manager 120 identifies that the second pointer (e.g., PTR #2) requires presence of a second particular type of resident download application on the computer system 110 to retrieve the content from the second remote location (e.g., source 170-2).

As previously discussed, the download manager 120 can repeat this process for each received pointer.

In step 740, the download manager 120 tracks or identifies a presence of any resident download applications (e.g., download applications 172) on computer system 110 that are available to retrieve requested content.

In step 745, the download manager 120 identifies which, if any, of the multiple types of download applications 172 resident on the computer system 110 can utilize at least one of the multiple pointers to retrieve the requested content.

In step 750, based on a relative priority associated with the pointers and depending on presence of the resident download applications, the download manager 120 selects a preferred pointer of the multiple pointers to retrieve the requested content.

In step 755, the download manager 120 initiates retrieval of the requested content over a respective type of network connection via use of the selected pointer. As previously discussed, initiating retrieval of the requested content can include communicating and forwarding the pointer to a respective download application 172. The download application, in turn, retrieves the requested content for playback by the media player 155.

Note again that techniques herein are well suited for enabling a media player and related functionality such as a download manager 120 as described herein. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method comprising:
    monitoring, at a processor of a computer system, pointers to instances of content stored at multiple network locations on a network, wherein a respective instance of the content stored at one of the multiple network locations, when played back on a media player, provides at least a portion of a same or similar user experience as is provided by playing back other instances of the content stored at other locations of the multiple network locations, and receiving metadata for each respective pointer specifying a type of download application used to retrieve the respective instance of the content via the respective pointer;
    selecting, via the processor, a pointer from the pointers to use to retrieve an instance of the content associated with the selected pointer based on whether the selected pointer's metadata specifies a peer-to-peer download application for retrieving the instance of the content associated with the selected pointer via a peer-to-peer network connection over the network, wherein selecting the pointer is further based on determining whether the peer-to-peer download application is resident to the computer system; and
    initiating, via the processor, retrieval of the instance of the content associated with the selected pointer over the network using the peer-to-peer download application.

2. The method of claim 1 wherein selecting the pointer comprises selecting a particular pointer that is used to download the instance of the content via the peer-to-peer network connection in lieu of selecting a different pointer that supports downloading of the instance of the content via a client-server connection.

3. The method of claim 1 wherein selecting the pointer is based on detecting whether the peer-to-peer download application used for downloading via a particular pointer is resident to the computer system.

4. The method of claim 1 wherein the pointers are received in monitoring a media feed for notification of content available for playback.

5. The method of claim 1 wherein the metadata is provided via a publisher of the content.

6. A non-transitory computer readable medium having instructions stored thereon for processing data information, such that the instructions, when carried out by a processing device of a computer system, cause the processing device to perform the operations comprising:
    monitoring pointers to instances of content stored at multiple network locations on a network, wherein a respective instance of the content stored at one of the multiple network locations, when played back on a media player, provides at least a portion of a same or similar user experience as is provided by playing back other instances of the content stored at other locations of the multiple network locations, and receiving metadata for each respective pointer specifying a type of download application used to retrieve the respective instance of the content via the respective pointer;
    selecting a pointer of the pointers to use to retrieve an instance of the content associated with the selected pointer based on whether the selected pointer's metadata specifies a peer-to-peer download application for retrieving the instance of the content associated with the selected pointer via a peer-to-peer network connection over the network, wherein selecting the pointer is further based on determining whether the seer-to-seer download application is resident to the computer system; and
    initiating retrieval of the instance of the content associated with the selected pointer over the network using the peer-to-peer download application.

7. The medium of claim 6 wherein selecting the pointer comprises selecting a particular pointer that is used to download the instance of the content via the peer-to-peer connection in lieu of selecting a different pointer that supports downloading of the instance of the content via a client-server connection.

8. The medium of claim 6 wherein selecting the pointer is based on detecting whether the peer-to-peer download application used for downloading via a particular pointer is resident to the computer system.

9. The medium of claim 6 wherein the pointers are received in monitoring a media feed for notification of content available for playback.

10. The medium of claim 6 wherein the metadata is provided via a publisher of the content.

11. A computer system comprising:
   a processor;
   a memory unit that stores instructions associated with an application executed by the processor; and
   an interconnect coupling the processor and the memory unit, enabling the computer system to execute the application and perform operations comprising:
      monitoring pointers to instances of content stored at multiple network locations on a network, wherein a respective instance of the content stored at one of the multiple network locations, when played back on a media player, provides at least a portion of a same or similar user experience as is provided by playing back other instances of the content stored at other locations of the multiple network locations, and receiving metadata for each respective pointer specifying a type of download application used to retrieve the respective instance of the content via the respective pointer;
   selecting a pointer of the pointers to use to retrieve an instance of the content associated with the selected pointer based on whether the selected pointer's metadata specifies a peer-to-peer download application for retrieving the instance of the content associated with the selected pointer via a peer-to-peer network connection over the network, wherein selecting the pointer is further based on determining whether the peer-to-peer download application is resident to the computer system; and
   initiating retrieval of the instance of the content associated with the selected pointer over the network using the peer-to-peer download application.

\* \* \* \* \*

UNITED STATES PATENT AND TRADEMARK OFFICE
CERTIFICATE OF CORRECTION

PATENT NO. : 8,589,368 B1
APPLICATION NO. : 13/211647
DATED : November 19, 2013
INVENTOR(S) : Brian Riggs et al.

Page 1 of 1

It is certified that error appears in the above-identified patent and that said Letters Patent is hereby corrected as shown below:

In the Claims

Column 16, Claim 6, Line 57:

Delete the words "seer-to-seer"; and
Insert the words --peer-to-peer--

Signed and Sealed this
Fifteenth Day of April, 2014

Michelle K. Lee
*Deputy Director of the United States Patent and Trademark Office*